Dec. 11, 1962  J. T. GERAGHTY, JR  3,067,520
GROOVE AND THREAD CHECKING GAUGE
Filed Jan. 23, 1959  2 Sheets-Sheet 1
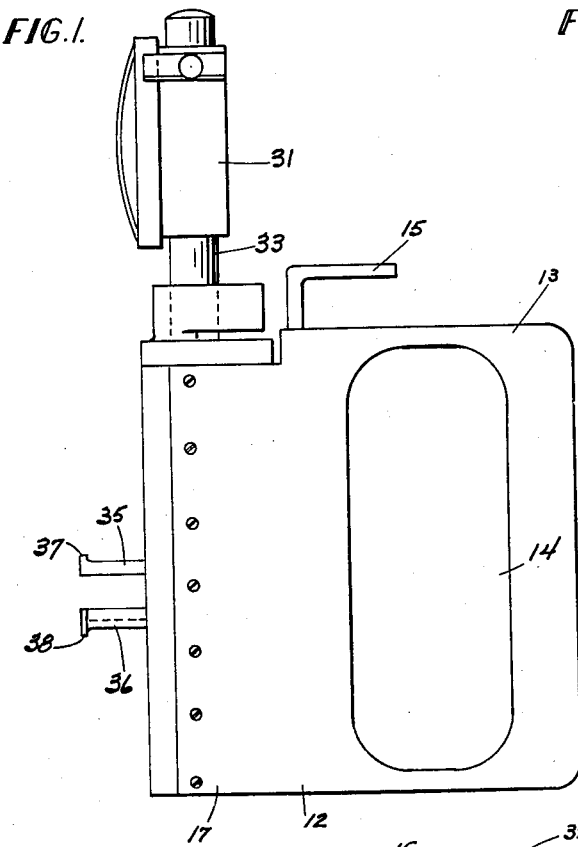
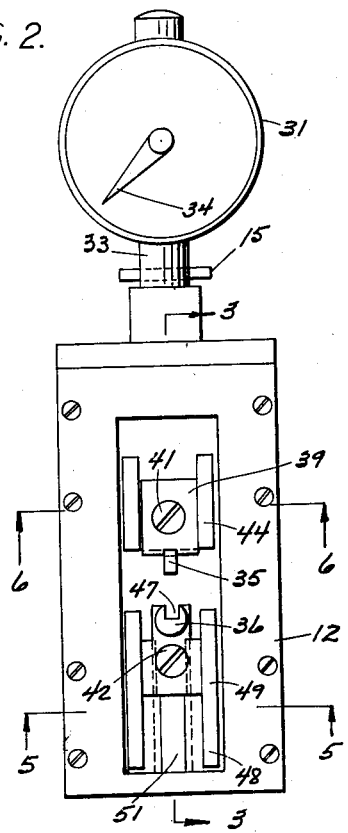
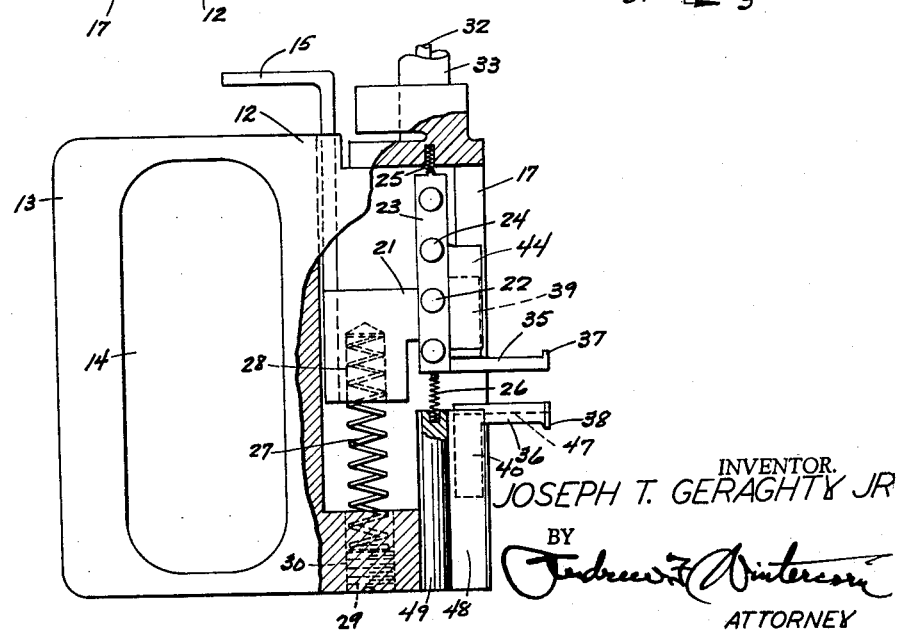
INVENTOR.
JOSEPH T. GERAGHTY JR
BY
ATTORNEY Dec. 11, 1962 J. T. GERAGHTY, JR 3,067,520
GROOVE AND THREAD CHECKING GAUGE
Filed Jan. 23, 1959 2 Sheets-Sheet 2

INVENTOR.
JOSEPH T. GERAGHTY JR.
BY
ATTORNEY

United States Patent Office 3,067,520
Patented Dec. 11, 1962

3,067,520
GROOVE AND THREAD CHECKING GAUGE
Joseph T. Geraghty, Jr., White Oak Ave., Rockford, Ill.
Filed Jan. 23, 1959, Ser. No. 788,609
7 Claims. (Cl. 33—147)

This invention relates to groove and thread checking gauges and is more particularly concerned with one designed especially for checking measurements of O-ring and snap-ring grooves, although the gauge, with slight modification, is also adapted for use as an internal thread gauge or comparator.

When O-rings and snap rings are inserted in internal grooves in bearings and other bores they require a groove of exactly the right depth for good performance, because if the groove is too deep the ring will not work, and if the groove is too shallow there is danger of the ring being forced out of the groove by the shaft when the shaft is entered into the bore. Hence, the necessity for micrometric checking of such grooves.

The gauge of my invention has a fixed post with a feeler on it to enter one side of the internal groove, and another post parallel to the first one is reciprocable toward and away from it and carries a similar feeler to enter the other side of the internal groove, a gauge mechanism operable by the movable post serving to indicate whether a given groove is within a given range—neither too shallow nor too deep in relation to a given dimension. For the measurement of grooves of small diameter in bores of smaller diameter it is a problem to provide working clearance for the posts carrying the feelers, and, in accordance with my invention, I provide one of the posts with a longitudinally extending groove to accommodate the other post which is made to fit therein, thereby enabling operating in bores of very small diameter.

A longitudinal recess is provided in accordance with my invention in the body of the gauge in alignment with the line of travel of the movable post, and a T-slot is provided in the bottom of the recess into which a slide block is entered from one end of the slot, the slide block having a screw-threaded hole therein to receive a screw entered in the attaching pad portion of the fixed post to enable adjusting the fixed post to a desired position and clamping it firmly to suit different diameters of bores with different diameters of internal grooves to be checked for depth. The attaching pad portions project from one side of the posts to enable close positioning and by reversing one or both posts the range of bore sizes that can be accommodated is greatly increased, but reversal of either of the posts requires reversal also of the feeler on the outer end thereof, and accordingly both posts are provided with diametrically extending grooves in the outer ends and the feelers have attaching end portions received in said grooves and fastened in place by screws.

The movable post is operable by means of a thumb-actuated trigger against the pressure of a compression spring, which, upon release of the trigger operates the gauge mechanism under spring pressure, and I provide an adjustable screw to back up the spring, the adjustment of which increases or decreases the compression of the spring to make the gauge function differently to suit the individual owner's preference and also to meet different working requirements.

The invention is illustrated in the accompanying drawings, in which

FIGS. 1 and 2 are a side view and front view, respectively, of a gauge made in accordance with my invention;

FIG. 3 is a view partly in side elevation and partly in longitudinal section on the line 3—3 of FIG. 2;

Similar reference numerals are applied to corresponding parts throughout the views.

Figure 5:
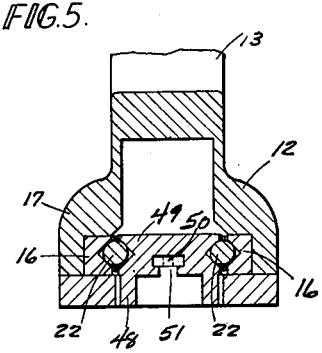
FIGS. 5 and 6 are cross sections on the correspondingly numbered lines of FIG. 2.
Figure 4:
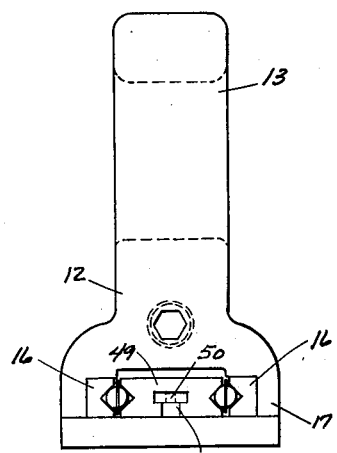
FIG. 4 is an end view.
Figure 7:
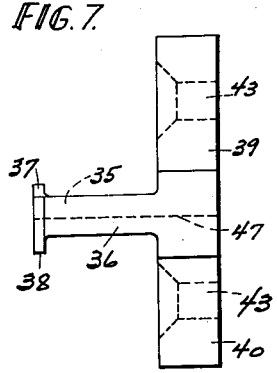
FIGS. 7, 8 and 9 are enlarged views of the interfitting posts shown in FIGS. 1–3, designed for use in small diameter bores, where other posts, like those shown in FIG. 10, could not be used.
Figure 6:
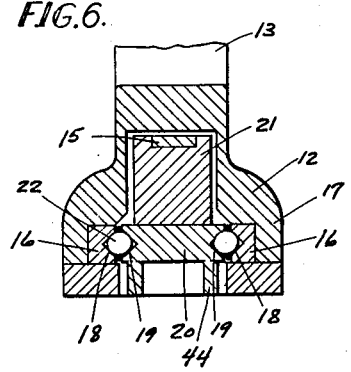
Figure 8:
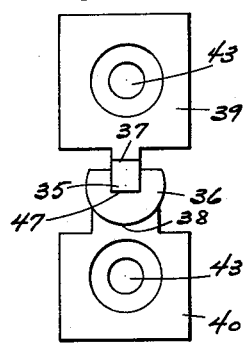

The present gauge, as mentioned before, is especially adapted for gauging O-ring and snap-ring grooves. However, there are other related uses, such as gauging inside splines, checking the internal diameter of opposite ends of a bore for uniform size, and checking the size of opposite ends of a tapered bore for accuracy.

Referring to the drawings, the reference numeral 12 designates the body of the gauge which has a handgrip 13 cast integral therewith, the hand opening 14 in the handgrip extending vertically, parallel to the line of movement of the trigger 15, which projects from the top of the handgrip for convenient operation by the thumb of the operator's hand holding the grip 13. Elongated ball races 16 are suitably secured in opposite sides of the bifurcated or forked front portion 17 of the body 12 and have longitudinally extending V-grooves 18 provided therein in opposed aligned relationship to longitudinally extending V-grooves 19 provided in the opposite sides of a rectangular slide 20 that is suitably attached by means of a block 21 to the adjacent trigger 15, and bearing balls 22 entered in the aligned grooves 18, 19 provide for anti-friction movement of the slide 20 longitudinally of the body 12. Elongated ball retainer plates 23 operate in the narrow spaces between the opposite sides of the slide 20 and races 16 and have longitudinally spaced holes 24 provided therein to accommodate the balls 22, and there are small coiled compression springs 25 and 26 abutting the opposite ends of the retainer plates 23, as shown in FIG. 3, yieldingly resisting endwise movement thereof in either direction with respect to the body 12. A relatively large coiled compression spring 27 has one end seated in a hole 28 provided therefor in the block 21 and has the other end resting on a screw-threaded plug 29 adjustably threaded in a bore 30 provided in the body 12, whereby depression of the trigger 15 to move the slide 20 is resisted by the compression of the spring 27, so that, when the trigger 15 after depression thereof in a groove gauging operation is released, the spring 27 returns the slide 20 to actuate the gauge mechanism 31 by means of a plunger 32 working in a bore provided therefor in a post 33 that supports the gauge mechanism 31 on the body 12. The plunger 32 moves in response to the return movement of the slide 20 to operate a needle or pointer 34 of the gauge mechanism in the usual way and according to the extent of return movement of the slide, which, in the present gauge, is determined by the amount of movement of the movable post 35, mounted on and movable with the slide 20, relative to a stationary or fixed post 36 mounted on the body 12. Post 35 has a feeler 37 thereon extending in one direction and post 36 has a feeler 38 thereon extending in the opposite direction, the two feelers being engageable in diametrically opposite sides of an internal groove, the diameter of which is to be checked with micrometric accuracy.

The posts 35 and 36 have rectangular attaching pad portions 39 and 40 in which screws 41 and 42 are entered in the holes 43 to fasten post 35 to slide 20 and post 36 to the body 12. Post 35 has its rectangular pad portion 39 fitting closely between the parallel side walls 44 provided on the slide 20 to prevent turning. Where post 35' (FIG. 10) is used, having the reversible feeler 37' fastened by its attaching end portion in the diametrically extending groove 45 provided in the outer end of the post, as by a screw 46 entered through a hole in said attaching end portion and threaded in a hole in the post, the reversal of the pad portion 39 indicated by the dotted position of the post in FIG. 10 makes an appreciable adjustment of the post possible so that a large range of groove diameters of large size can be accommodated with the gauge. The reduction in cross-sectional dimensions of post 35 to enable its fitting in the longitudinal groove 47 provided in the inner side of post 36 enables use of the gauge in bores of much smaller size than could otherwise be accommodated with the gauge, thereby greatly increasing the range of usefulness of the gauge in that direction.

Post 36 has its pad portion 40 slidable with a close fit between the parallel side walls 48 provided on the fixed plate 49, and the screw 42 for clamping the pad portion 40 threads in a nut 50 that is slidable but non-rotatable in the wide portion of a T-slot 51 provided in the plate 49 longitudinally thereof, so that the post 36 which is normally fixed, is adjustable toward or away from the movable post 35 to suit the requirements of any particular job of gauge work, and a large range of groove diameters of large sizes can be accommodated with the present gauge. Where post 36' (FIG. 10) is used, having the reversible feeler 38' fastened by its attaching end portion in the diametrically extending groove 45 provided in the outer end of the post, as by a screw 46 entered through a hole in the attaching end portion and threaded in a hole in the post, the reversal of the pad portion 40 indicated by the dotted position of the post in FIG. 10 makes an appreciable further adjustment of the post possible so that a still larger range of groove diameters can be accommodated with the present gauge.

Figures 10, 11:
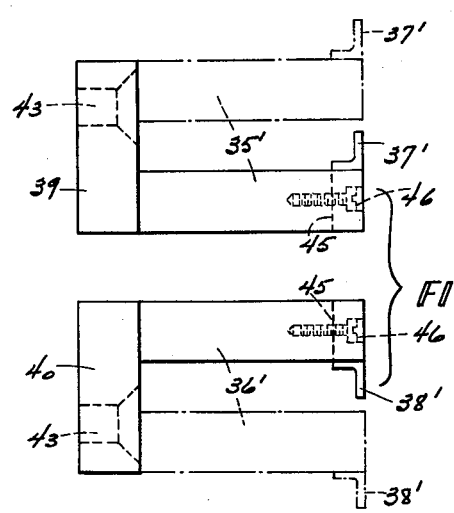
FIG. 10 is a view similar to FIG. 7, showing other posts with demountable and reversible feelers.
FIG. 11 is an end view of one of these posts, showing how the feeler is demountably secured in a diametrically extending groove provided in the outer end thereof.
Figure 9:
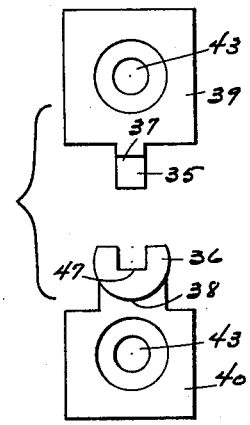

In lieu of the feelers 37' and 38' shown in FIG. 10 designed for operation in O-ring grooves, it should be obvious that I can substitute a pair of jaws threaded on their outer sides for use as thread gauge comparators, as in Swanson Patent No. 2,782,523, for example, the one jaw engaging on one side of an internally threaded bore and the other jaw on the diametrically opposite side, as described in said patent.

It is believed the foregoing description conveys a good understanding of the objects and advantages of my invention. The appended claims have been drawn to cover all legitimate modifications and adaptations.

I claim:

1. In a gauge of the character described comprising a body, a fixed post thereon, a movable post disposed in parallel relationship to the fixed post and guided on said body for movement toward and away from the fixed post, feelers on one end of the posts for engagement in a bore on diametrically opposite sides thereof, and an indicator on said body having a stem engaged by the movable post to indicate the spacing of said feelers, the improvement which comprises attaching pad portions on the other ends of said posts remote from the feelers in right angle relationship to the posts and extending wholly to one side of the respective posts, the said attaching pad portions serving to mount the posts detachably and being reversible end for end to space the posts closer together in one position of said attaching portions and farther apart in the reverse position, to suit the requirements of smaller bores and larger bores, respectively.

2. In a gauge of the character described comprising a body, a fixed post thereon, a movable post disposed in parallel relationship to the fixed post and guided on said body for movement toward and away from the fixed post, feelers on one end of the posts for engagement in a bore on diametrically opposite sides thereof, and an indicator on said body having a stem engaged by the movable post to indicate the spacing of said feelers, the improvement which comprises attaching pad portions on the other ends of said posts remote from the feelers in right angle relationship to the posts and extending wholly to one side of the respective posts, the said attaching pad portions serving to mount the posts detachably and being reversible end for end to space the posts closer together in one position of said attaching portions and farther apart in the reverse position, to suit the requirements of smaller bores and larger bores, respectively, and the feelers being detachably secured on the ends of said posts remote from said attaching pad portions and extending wholly to one side of the respective posts, the feelers being mounted on the posts in one position extending in the same directions as the attaching pad portions for gauging small bores and being reversed end for end to extend in the opposite direction when the attaching pad portions are reversed for operation in larger bores.

3. In a gauge of the character described comprising a body, a fixed post thereon, a movable post disposed in parallel relationship to the fixed post and guided on said body for movement toward and away from the fixed post, feelers on the posts for engagement in a bore on diametrically opposite sides thereof, and an indicator on said body having a stem engaged by the movable post to indicate the spacing of said feelers, the improvement which consists in said posts having diametrically extending grooves provided in the outer ends thereof in aligned relationship to one another to accommodate feelers, the feelers being separate elements each having an attaching portion on one end of a feeler portion, said attaching portions being adapted to be detachably secured to said posts and engaged in said grooves with the feeler portions in coplanar relationship but extending in either of two diametrically opposed directions with respect to said attaching portions, whereby to permit use interchangeably of different feelers and different kinds of feelers for different kinds of gauging operations, as well as permitting reversal of said feelers to extend in either direction in respect to their attaching portions.

4. In a gauge of the character described comprising a body, a fixed post thereon, a movable post disposed in parallel relationship to the fixed post and guided on said body for movement toward and away from the fixed post, feelers on the posts for engagement in a bore on diametrically opposite sides thereof, and an indicator on said body having a stem engaged by the movable post to indicate the spacing of said feelers, the improvement which comprises means in said body in connection with the fixed post for slidably adjustably securing the fixed post in any selected position of adjustment within a given range toward and away from the movable post and in line with the movement thereof to accommodate a large range of bore sizes to be gauged, and an attaching pad portion on that end of the fixed post remote from the feeler and extending wholly to one side of said post normally away from the other post, the attaching pad portion being detachably secured and being reversible end for end to extend toward the other post and accordingly dispose the fixed post farther from the movable post to accommodate a proportionately larger range of sizes of bores to be gauged.

5. In a gauge of the character described comprising a body, a fixed post thereon, a movable post disposed in parallel relationship to the fixed post and guided on said body for movement toward and away from the fixed post, feelers on the posts for engagement in a bore on diametrically opposite sides thereof, and an indicator on said body having a stem engaged by the movable post to indicate the spacing of said feelers, the improvement which comprises means in said body in connection with the fixed post for slidably adjustably securing the fixed post in any selected position of adjustment within a given range toward and away from the movable post and in line with the movement thereof to accommodate a large range of bore sizes to be gauged, and an attaching pad portion on that end of the fixed post remote from the feeler and extending wholly to one side of said post normally away from the other post, the attaching pad portion being detachably secured and being reversible end for end to extend toward the other post and accordingly dispose the fixed post farther from the movable post to accommodate a proportionately larger range of sizes of bores to be gauged, the feeler on the fixed post being detachably secured thereto and normally extending away from the movable post but upon reversal of the attaching pad portion being also reversed to extend away from the movable post in the reversed position of said attaching pad portion.

6. In a gauge of the character described comprising a body, a fixed post thereon, a movable post disposed in parallel relationship to the fixed post and guided on said body for movement toward and away from the fixed post, feelers on one end of the posts for engagement in a bore on diametrically opposite sides thereof, and an indicator on said body having a stem engaged by the movable post to indicate the spacing of said feelers, the improvement which comprises attaching pad portions on the other ends of said posts remote from the feelers in right angle relationship to the posts and extending wholly to one side of the respective posts, the said attaching pad portions serving to mount the posts detachably and being reversible end for end to space the posts closer together in one position of said attaching portions and farther apart in the reverse position, to suit the requirements of smaller bores and larger bores, respectively, one of said posts having a longitudinally extending groove provided therein in one side thereof which, when the attaching pad portions are disposed in the position for the gauge measuring small bores is arranged to accommodate the other post in an extreme adjustment of the gauge, whereby to suit the requirements of smaller bores.

7. In a gauge of the character described comprising a body, a fixed post thereon, a movable post disposed in parallel relationship to the fixed post and guided on said body for movement toward and away from the fixed post, feelers on the posts for engagement in a bore on diametrically opposite sides thereof, and an indicator on said body having a stem engaged by the movable post to indicate the spacing of said feelers, the improvement which comprises means in said body in connection with the fixed post for slidably adjustably securing the fixed post in any selected position of adjustment within a given range toward and away from the movable post and in line with the movement thereof to accommodate a large range of bore sizes to be gauged, and an attaching pad portion on that end of the fixed post remote from the feeler and extending wholly to one side of said post normally away from the other post, the attaching pad portion being detachably secured and being reversible end for end to extend toward the other post and accordingly dispose the fixed post farther from the movable post to accommodate a proportionately larger range of sizes of bores to be gauged, one of said posts having a longitudinally extending groove provided therein in that side that is toward the other post when said attaching pad portion is secured for the gauge measuring small bore sizes, said groove accommodating the other post when the movable post is at an extreme position relative to the fixed post, whereby to enable operation of the gauge in gauging bores of smaller diameter.

References Cited in the file of this patent

UNITED STATES PATENTS

| | | |
|---|---|---|
| 1,257,483 | Hart et al. | Feb. 26, 1918 |
| 1,634,156 | McCommon | June 28, 1927 |
| 2,412,421 | Polk et al. | Dec. 10, 1946 |
| 2,775,820 | Worthen | Jan. 1, 1957 |
| 2,782,523 | Swanson | Feb. 26, 1957 |
| 2,849,797 | Etchell | Sept. 2, 1958 |

OTHER REFERENCES

Catalog D, Nilsson Gage Co. Poughkeepsie, N.Y. (Rec'd June 8, 1953).

Publication, Amer. Mach., Mar. 19, 1951, page 202, copy in library.